United States Patent
Iwama et al.

(10) Patent No.: US 9,562,200 B2
(45) Date of Patent: Feb. 7, 2017

(54) METHOD FOR PRODUCING LUBRICANT BASE OIL

(71) Applicant: JX NIPPON OIL & ENERGY CORPORATION, Tokyo (JP)

(72) Inventors: Marie Iwama, Tokyo (JP); Kazuaki Hayasaka, Tokyo (JP); Yoshiyuki Nagayasu, Tokyo (JP); Koshi Takahama, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 86 days.

(21) Appl. No.: 14/388,338

(22) PCT Filed: Mar. 29, 2013

(86) PCT No.: PCT/JP2013/059579
§ 371 (c)(1),
(2) Date: Sep. 26, 2014

(87) PCT Pub. No.: WO2013/147178
PCT Pub. Date: Oct. 3, 2013

(65) Prior Publication Data
US 2015/0060332 A1 Mar. 5, 2015

(30) Foreign Application Priority Data

Mar. 30, 2012 (JP) .................. 2012-082399

(51) Int. Cl.
*C10G 65/14* (2006.01)
*C10G 65/02* (2006.01)
(Continued)

(52) U.S. Cl.
CPC .............. *C10G 65/14* (2013.01); *B01J 29/061* (2013.01); *B01J 29/068* (2013.01); *C10G 45/64* (2013.01);
(Continued)

(58) Field of Classification Search
CPC ................... B01J 29/061; B01J 29/068; C10G 2300/1022; C10G 45/58; C10G 45/64; C10G 47/12; C10G 65/14; C10G 69/02; C10G 67/04; C10M 101/02; C10M 2203/1006
See application file for complete search history.

(56) References Cited

U.S. PATENT DOCUMENTS 6,080,301 A * 6/2000 Berlowitz ................ C10G 2/00
208/18
7,282,137 B2 10/2007 Cody et al.
(Continued)

FOREIGN PATENT DOCUMENTS

| CN | 1761734 A | 4/2006 |
| CN | 101090957 A | 12/2007 |

(Continued)

OTHER PUBLICATIONS

International Preliminary Report on Patentability from Application No. PCT/JP2013/059579, mail date is Dec. 4, 2014.
(Continued)

*Primary Examiner* — Renee E Robinson
*Assistant Examiner* — Derek Mueller
(74) *Attorney, Agent, or Firm* — Greenblum & Bernstein, P.L.C.

(57) ABSTRACT

A method for producing a lubricant base oil, the method comprising a first step of fractionating, from a hydrocarbon oil containing a base oil fraction and a heavy fraction that is heavier than the base oil fraction, the base oil fraction and the heavy fraction, and a second step of obtaining a dewaxed oil by isomerization and dewaxing of the base oil fraction fractionated in the first step, wherein a hydrocracked oil obtained by hydrocracking the heavy fraction fractionated in the first step is returned to the first step.

5 Claims, 1 Drawing Sheet

(51) Int. Cl.
*B01J 29/068* (2006.01)
*C10G 45/64* (2006.01)
*C10G 47/12* (2006.01)
*C10M 101/02* (2006.01)
*B01J 29/06* (2006.01)
*C10G 69/02* (2006.01)

(52) U.S. Cl.
CPC ............... *C10G 47/12* (2013.01); *C10G 69/02* (2013.01); *C10M 101/02* (2013.01); *C10G 2300/1022* (2013.01); *C10M 2203/1006* (2013.01)

(56) References Cited

U.S. PATENT DOCUMENTS

| 2004/0108249 | A1 | 6/2004 | Cody et al. |
| 2008/0156697 | A1 | 7/2008 | Dierickx |
| 2011/0042267 | A1* | 2/2011 | Hayasaka ............... B01J 29/064 208/27 |

FOREIGN PATENT DOCUMENTS

| CN | 101939102 A | 1/2011 |
| CN | 101942336 A | 1/2011 |
| JP | 2006-502297 | 1/2006 |
| JP | 2008-525607 | 7/2008 |
| JP | 2011-068728 | 4/2011 |
| JP | 2012-041450 | 3/2012 |
| KR | 1019990072206 A | 9/1999 |
| KR | 10-2010-0127771 A | 12/2010 |
| KR | 2010-0127771 A | 12/2010 |
| KR | 2011-0121334 A | 11/2011 |
| WO | 2009/099111 | 8/2009 |

OTHER PUBLICATIONS

Chinese Office Action issued for application No. 201380025019.5, mail date is May 6, 2015.
Chinese Office Action issued with respect to application No. 201380025019.5, mail date is Dec. 30, 2015.
English translation of International Preliminary Report on Patentability for WO Patent Application No. PCT/JP2013/059579, which was mailed Oct. 9, 2014.
International Search Report of Patent Application No. PCT/JP2013/059579 mailed Jun. 25, 2013; with an English Translation thereof.
Notice of Allowance issued in Korean Counterpart Patent Application No. 10-2014-7027699, mailed Sep. 28, 2016.

* cited by examiner

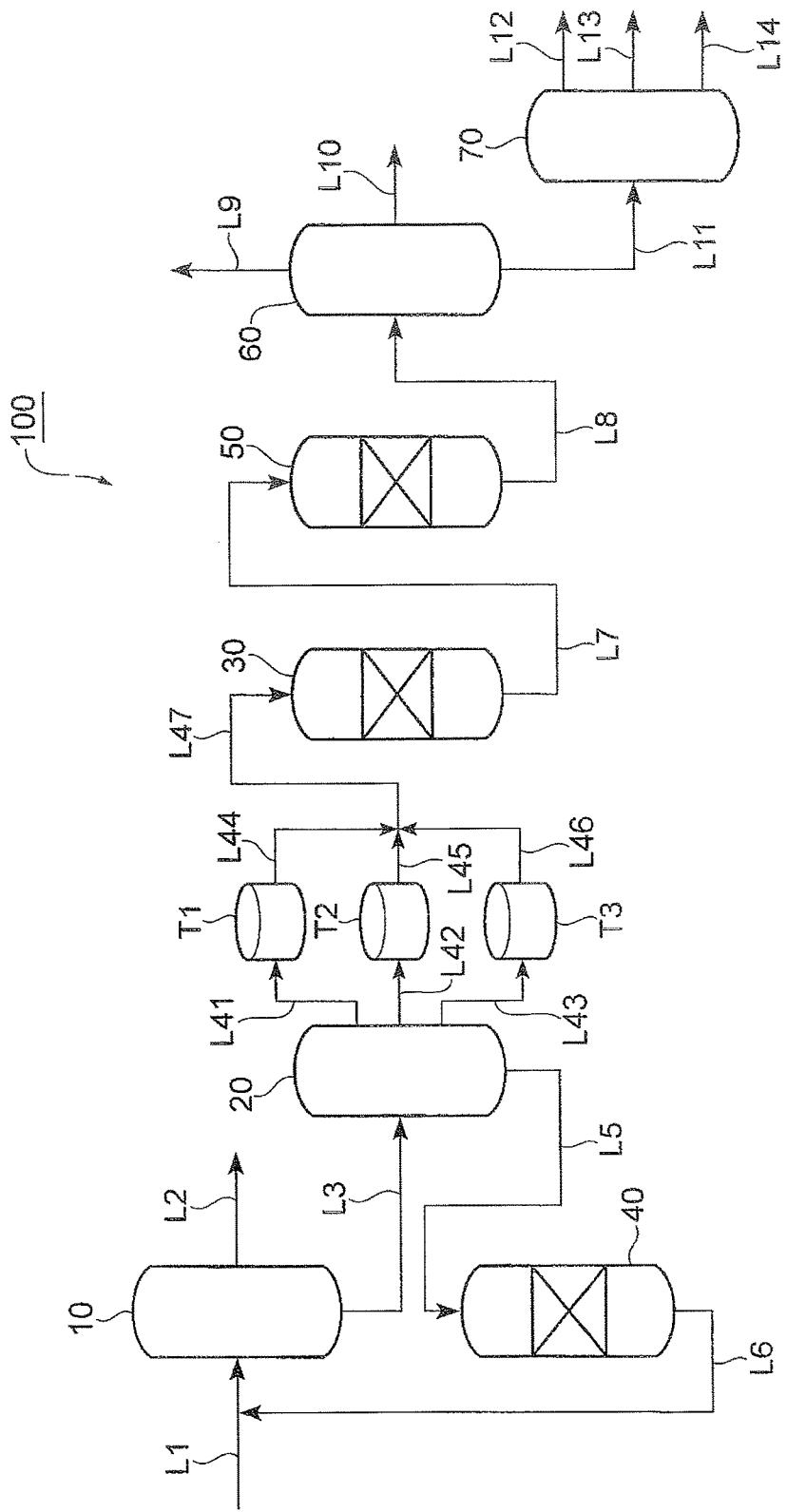

METHOD FOR PRODUCING LUBRICANT BASE OIL

TECHNICAL FIELD

The present invention relates to a method for producing a lubricant base oil.

BACKGROUND ART

Among petroleum products, for example, lubricant, gas oil, and jet fuel are products in which importance is placed on cold flow property. Consequently, it is desirable that the base oil used for these products is such that its wax component, such as a normal paraffin or a slightly branched isoparaffin, which is a factor in deterioration of cold flow property, has been completely or partially removed, or converted into a component other than a wax component.

An example of a known dewaxing technique for removing the wax component from a hydrocarbon oil is a method in which the wax component is extracted using a solvent such as liquefied propane or MEK. However, this method suffers from the problem which is, for example that operating costs are high, the types of feedstock that can be used are limited, and the product yield is limited by the type of feedstock.

On the other hand, an example of a known dewaxing technique for converting the wax component in a hydrocarbon oil into a non-wax component is isomerization and dewaxing, in which the hydrocarbon oil is brought into contact with, in the presence of hydrogen, a bifunctional hydroisomerization catalyst capable of hydrogenation-dehydrogenation and isomerization, thereby isomerizing normal paraffins in the hydrocarbon oil to isoparaffins (e.g., Patent Literature 1).

CITATION LIST

Patent Literature

[Patent Literature 1] National Publication of International Patent Application No. 2006-502297

SUMMARY OF INVENTION

Technical Problem

Since depending on the intended usage there are many types of lubricant base oil product, and since the needed low-temperature performance and viscosity property are different for each product, it is desirable to obtain many fractions corresponding to the intended products.

Consequently, conventionally, when using a feedstock containing a fraction (heavy fraction) that is heavier than the fraction (product fraction) corresponding to an intended product to produce a lubricant base oil, a method for performing the above-described isomerization and dewaxing by subjecting the feedstock to a hydrocracking treatment to lighten the mass of the heavy fraction has been known.

It is an object of the present invention to provide a method for producing a lubricant base oil capable of efficiently obtaining a lubricant base oil from a hydrocarbon oil containing a heavy fraction.

Solution to Problem

The present invention relates to a method for producing a lubricant base oil, the method comprising a first step of fractionating, from a hydrocarbon oil containing a base oil fraction and a heavy fraction that is heavier than the base oil fraction, the base oil fraction and the heavy fraction, and a second step of obtaining a dewaxed oil by isomerization and dewaxing of the base oil fraction fractionated in the first step, wherein a hydrocracked oil obtained by hydrocracking the heavy fraction fractionated in the first step is returned to the first step.

In the present invention, it is preferred that the base oil fraction is a fraction having a boiling point range of 330 to 520° C. Based on a base oil fraction having a boiling point range in the above range, a useful lubricant base oil can be produced more efficiently.

In the present invention, the hydrocarbon oil may contain a Fischer-Tropsch synthesis reaction oil. In this case, it is preferred to carry out the above-described hydrocracking by, in the presence of hydrogen, bringing the heavy fraction into contact with a hydrocracking catalyst containing an inorganic support that is a solid acid and a metal of groups 8 to 10 of the periodic table of the elements that is supported on the inorganic support and that has a hydrogenation activity.

In the present invention, the hydrocarbon oil may contain a petroleum-derived hydrocarbon oil. In this case, it is preferred to carry out the above-described hydrocracking by, in the presence of hydrogen, bringing the heavy fraction into contact with a hydrocracking catalyst containing a porous inorganic oxide that includes two or more elements selected from aluminum, silicon, zirconium, boron, titanium, and magnesium, and one or more metals selected from the elements of group 6, group 8, group 9, and group 10 of the periodic table that are supported on the porous inorganic oxide.

Further, in the present invention, it is preferred that the conversion rate of the hydrocracking is 20 to 50% by volume. By performing hydrocracking at such a conversion rate, a lubricant base oil can be obtained much more efficiently.

In addition, in the present invention, the second step may be a step of obtaining the dewaxed oil by bringing the base oil fraction into contact with a hydroisomerization catalyst. Here, it is preferred that the hydroisomerization catalyst is a hydroisomerization catalyst containing a support that includes a zeolite having a one-dimensional porous structure including a 10-membered ring and a binder, and platinum and/or palladium supported on the support, in which the carbon content of the catalyst is 0.4 to 3.5% by mass and the micropore volume is 0.02 to 0.12 cc/g. Further, as the zeolite, preferred is zeolite derived from an ion-exchanged zeolite obtained by ion-exchanging an organic template-containing zeolite that contains an organic template and has a one-dimensional porous structure including a 10-membered ring in a solution containing ammonium ions and/or protons, in which the micropore volume per unit mass is 0.01 to 0.12 cc/g.

Advantageous Effects of Invention

According to the present invention, provided is a method for producing a lubricant base oil capable of efficiently obtaining a lubricant base oil from a hydrocarbon oil containing a heavy fraction.

BRIEF DESCRIPTION OF DRAWINGS

FIG. 1 is a flow diagram illustrating an example of a lubricant base oil production apparatus for carrying out the method for producing a lubricant base oil according to the present invention.

DESCRIPTION OF EMBODIMENTS

Preferred embodiments of the present invention will now be described in more detail with reference to the drawing.

The method for producing a lubricant base oil according to the present embodiment includes a first step of fractionating, from a hydrocarbon oil containing a base oil fraction and a fraction (heavy fraction) that is heavier than the base oil fraction, the base oil fraction and the heavy fraction (hereinafter sometimes referred to as a "first distillation step"), and a second step of obtaining a dewaxed oil by isomerization and dewaxing of the base oil fraction fractionated in the first step (hereinafter sometimes referred to as a "dewaxing step"). Further, in the method for producing a lubricant base oil according to the present embodiment, a hydrocracked oil obtained by hydrocracking the heavy fraction fractionated in the first step is supplied to the first step (as a part of the hydrocarbon oil).

In addition, the method for producing a lubricant base oil according to the present embodiment may further include a hydrorefining step of obtaining a hydrorefined oil by hydrorefining the dewaxed oil obtained in the second step, and a second distillation step of obtaining a lubricant base oil by fractionating the hydrorefined oil.

Moreover, the method for producing a lubricant base oil according to the present embodiment may further include a second distillation step of obtaining a lubricant fraction by fractionating the dewaxed oil obtained in the second step, and a hydrorefining step of hydrorefining the lubricant fraction.

Each of these steps will now be described in more detail.

(First Distillation Step)

In the first distillation step, from a hydrocarbon oil containing a base oil fraction and a heavy fraction, the base oil fraction and the heavy fraction are each fractionated.

The base oil fraction is a fraction for obtaining a lubricant base oil by carrying out a dewaxing step, a hydrorefining step, and a second distillation step which will be described later. The boiling point range of the base oil fraction can be appropriately changed based on the intended product.

It is preferred that the base oil fraction is a fraction having a boiling point range of 330 to 520° C. By setting so that the base oil fraction is a fraction having a boiling point range in the above-described range, a useful lubricant base oil can be produced more efficiently. Further, the fact that the boiling point range is from 330 to 520° C. indicates that the initial boiling point and the final boiling point are in the range of 330 to 520° C.

The heavy fraction is a fraction that has a higher boiling point than the base oil fraction. Specifically, the heavy fraction is a fraction having a boiling point that is higher than the final boiling point of the base oil fraction, for example, a fraction having a boiling point higher than 520° C.

The hydrocarbon oil may also have, other than the base oil fraction and the heavy fraction, a fraction (light fraction) that has a lower boiling point than the base oil fraction. For example, the light fraction is a fraction having a boiling point lower than 330° C.

It is preferred that the content of the base oil fraction in the hydrocarbon oil is, based on the total amount of hydrocarbon oil, 30 to 90% by volume, and more preferred is 40 to 80% by volume.

It is preferred that the content of the heavy fraction in the hydrocarbon oil is, based on the total amount of hydrocarbon oil, 10 to 70% by volume, and more preferred is 20 to 60% by volume.

Examples of the hydrocarbon oil include hydrotreated or hydrocracked gas oil, heavy gas oil, vacuum gas oil, lubricant raffinate, lubricant raw material, bright stock, slack wax (crude wax), foot's oil, deoiled wax, paraffinic wax, microcrystalline wax, petrolatum, synthetic oils, Fischer-Tropsch synthesis reaction oil (hereinafter, referred to as an "FT synthetic oil"), high-pour-point polyolefins, and straight-chain α-olefin waxes. These hydrocarbon oils can be used singly or in combinations of two or more. Especially preferred as the hydrocarbon oil is at least one selected from the group consisting of vacuum gas oil, hydrocracked vacuum gas oil, atmospheric residue, hydrocracked atmospheric residue, vacuum residue, hydrocracked vacuum residue, slack wax, dewaxed oil, paraffin wax, microcrystalline wax, petrolatum, and FT synthetic oil.

In one aspect of the present invention, FT synthetic oil is preferred as the hydrocarbon oil. FT synthetic oil is a synthetic oil that in principle does not contain sulfur content or aromatic hydrocarbons. Therefore, by using FT synthetic oil as a raw material, a lubricant base oil can be produced that has a small burden on the environment. Further, since sulfur content is a catalyst poison for hydroisomerization catalysts and hydrocracking catalysts, when a sulfur content-free FT synthetic oil is used, catalyst poisoning is suppressed, and the life of the catalyst improves. In the present specification, a synthetic oil synthesized by a Fischer-Tropsch reaction is referred to as "FT synthetic oil." A wax component included in FT synthetic oil is referred to as "FT wax."

The FT synthetic oil can be produced by the following method, for example. First, desulfurization of natural gas in the raw material is carried out. Specifically, sulfur compounds in the natural gas are converted into hydrogen sulfide by a hydrodesulfurization catalyst, and are removed using a hydrogen sulfide absorber.

A high-temperature synthesis gas having carbon monoxide gas and hydrogen gas as main components is produced by a reformation reaction (reforming) of the desulfurized natural gas. The natural gas reformation reaction is represented by the chemical reaction formulae (1) and (2). The reformation method is not limited to a water vapor/carbon dioxide gas reformation method that uses carbon dioxide and water vapor. For example, a water vapor reformation method, a partial oxidation reformation method (PDX) that uses oxygen, an auto-thermal reformation method (ATR) that is a combination of a partial oxidation reformation method and a water vapor reformation method, and a carbon dioxide gas reformation method can also be utilized.

$$CH_4 + H_2 \rightarrow CO + 3H_2 \qquad (1)$$

$$CH_4 + CO_2 \rightarrow 2CO + 2H_2 \qquad (2)$$

The hydrogen gas and the carbon monoxide gas in the synthesis gas are reacted. Namely, the FT synthetic oil is produced by making an FT reaction like that illustrated in the chemical reaction formula (3) proceed.

$$(2n+1)H_2 + nCO \rightarrow C_nH_{2n+2} + nH_2O \qquad (3)$$

As a catalyst for the FT reaction (FT catalyst), a catalyst in which an active metal is supported on an inorganic support can be used. Examples of the inorganic support include a porous oxide such as silica, alumina, titania, magnesia, and zirconia. Examples of the active metal include cobalt, ruthenium, iron, and nickel. In addition to the above-described active metals, a compound including a metal element of zirconium, titanium, hafnium, sodium, lithium, magnesium and the like may also be supported on the FT catalyst. These components improve catalytic activity and contribute to the control of the number of carbon atoms and its distribution in the FT synthetic oil.

The FT synthetic oil synthesized by the above method is a mixture of straight-chain hydrocarbons (normal paraffins) having about 1 to 100 carbon atoms, which hardly includes any aromatic hydrocarbons, naphthenic hydrocarbons, or isoparaffin. In the FT synthetic oil, an FT wax is included that has about 17 or more carbon atoms, and a boiling point exceeding about 330° C. It is preferred that the FT wax content in the FT synthetic oil is 30% by mass or more. By appropriately adjusting the above-described reaction conditions, the FT wax content can be easily controlled.

Further, in another aspect of the present invention, it is preferred to use as the hydrocarbon oil a petroleum-derived hydrocarbon oil containing petroleum-derived hydrocarbons. Examples of the petroleum-derived hydrocarbon oil include hydrocracked vacuum gas oil, hydrocracked atmospheric residue, hydrocracked vacuum residue, slack wax (crude wax), foot's oil, deoiled wax, paraffinic wax, and microcrystalline wax.

A vacuum gas oil, which is a distillate oil obtained from a crude oil vacuum distillation apparatus, is a hydrocarbon oil that has a boiling point range of about 350 to 550° C. Further, an atmospheric residue, which is a bottom oil extracted from an atmospheric distillation apparatus, is a hydrocarbon oil that has a boiling point range of 350° C. or more. In addition, a vacuum residue, which is a bottom oil extracted from a vacuum distillation apparatus, is a hydrocarbon oil that has a boiling point range of 550° C. or more. A hydrocracked vacuum gas oil is a hydrocarbon oil obtained by hydrocracking a vacuum gas oil. A hydrocracked atmospheric residue is a hydrocarbon oil obtained by hydrocracking an atmospheric residue. A hydrocracked vacuum residue is a hydrocarbon oil obtained by hydrocracking a vacuum residue. Further, it is desirable that the hydrocracked vacuum gas oil, hydrocracked atmospheric residue, and hydrocracked vacuum residue are each used as products obtained by performing a desulfurization treatment to remove sulfur to the extent that the catalyst in the second step does not excessively deteriorate.

The distillation conditions in the first distillation step are not especially limited, as long as the base oil fraction and the heavy fraction can each be fractionated from the hydrocarbon oil. For example, the first distillation step may be a step of fractionating the base oil fraction and the heavy fraction from the hydrocarbon oil by vacuum distillation, or may be a step of fractionating the base oil fraction and the heavy fraction from the hydrocarbon oil based on a combination of atmospheric distillation and vacuum distillation.

For example, when the hydrocarbon oil contains 20% by volume or more of the light fraction, it is preferred that the first distillation step is carried out by atmospheric distillation for distilling away the light fraction from the hydrocarbon oil, and vacuum distillation for fractionating the base oil fraction and the heavy fraction from the bottom oil of the atmospheric distillation.

In the first distillation step, the base oil fraction may be fractionated as a single fraction, or may be fractionated as a plurality of fractions according to the desired lubricant base oil. For example, in the first distillation step, a first base oil fraction having a boiling point of 330 to 410° C. under atmospheric pressure, a second base oil fraction having a boiling point of 410 to 470° C., and a third base oil fraction having a boiling point of 470 to 520° C., can each be fractionated. The plurality of base oil fractions thus fractionated can each be independently subjected to the subsequent dewaxing step. Further, a part or all of the plurality of base oil fractions can be mixed and subjected to the subsequent dewaxing step.

(Hydrocracking of the Heavy Fraction)

In the method for producing a lubricant base oil according to the present embodiment, a hydrocracked oil is obtained by hydrocracking the heavy fraction fractionated in the first distillation step. This hydrocracked oil is used as a part of the hydrocarbon oil subjected to the first distillation step. The method for producing a lubricant base oil according to the present embodiment can efficiently obtain a lubricant base oil by such hydrocracking of the heavy fraction and reutilization of the hydrocracked oil obtained by the hydrocracking in the first distillation step.

The hydrocracking can be carried out by, in the presence of hydrogen, bringing the heavy fraction into contact with a hydrocracking catalyst. When the hydrocarbon oil is FT synthetic oil, for example, it is preferred to use as the hydrocracking catalyst a catalyst (hereinafter, a "hydrocracking catalyst A") in which at least one active metal selected from metals of groups 8 to 10 of the periodic table is supported on an inorganic support that is a solid acid. Especially, when the hydrocarbon oil is FT synthetic oil, it is preferred to use the hydrocracking catalyst A, because there is less risk of catalyst poisoning due to sulfur content.

Examples of the inorganic support that is a solid acid in the hydrocracking catalyst A include supports formed from one or more inorganic compounds selected from the group consisting of crystalline zeolites, such as ultrastable Y-type (USY) zeolite, Y-type zeolite, mordenite, and β-zeolite, as well as amorphous composite metal oxides such as silica-alumina, silica-zirconia, and alumina-boria. Among these, preferred are supports formed from a USY-type zeolite and one or more amorphous composite metal oxides, such as silica-alumina, alumina-boria, and silica-zirconia, and more preferred are supports formed from a USY-type zeolite and alumina-boria and/or silica-alumina.

A USY-type zeolite is a zeolite that has been made ultrastable by hydrothermally treating or acid treating a Y-type zeolite. A USY-type zeolite has the fine pore structure that a Y-type zeolite inherently has. This fine pore structure is a structure formed from micropores having a pore size of 2 nm or less. In a USY-type zeolite, in addition to the above-described fine pore structure, new pores having a pore size of 2 to 10 nm are additionally formed. The average particle size of the USY-type zeolite, which although is not especially limited, is preferably 1.0 μm or less, and more preferably 0.5 μm or less. Further, the silica/alumina molar ratio (molar ratio of silica based on alumina) in the USY-type zeolite is preferably 10 to 200, more preferably 15 to 100, and even more preferably 20 to 60.

It is preferred that the support of the hydrocracking catalyst A includes 0.1 to 80% by mass of crystalline zeolite and 0.1 to 60% by mass of amorphous composite metal oxide.

A binder may be blended in the support of the hydrocracking catalyst A in order to improve the moldability and the mechanical strength of the support. Examples of a preferred binder include alumina, silica, titania, and magnesia. Among these, alumina is preferred. The amount of the binder blended, which although is not especially limited, is preferably 20 to 98% by mass, and more preferably 30 to 96% by mass, based on the total mass of the support.

It is preferred that the support of the hydrocracking catalyst A is extruded. Examples of the shape of the extruded support include, but are not especially limited to, a spherical shape, a cylindrical shape, an irregular cylindrical shape having a three leaf shaped or a four leaf shaped cross-section, and a disk shape. As the method for extruding the support, a known method such as extrusion and compression extruding can be used without limitation. The extruded support is normally calcined.

The support of the hydrocracking catalyst A can be produced by, for example, forming a support composition including the above-described inorganic compound that is a solid acid and the binder, and then calcining.

It is preferred that the blending ratio of the inorganic compound that is a solid acid is, based on the total mass of the support composition, 1 to 70% by mass, and more preferred is 2 to 60% by mass. Further, if the support composition includes a USY-type zeolite, it is preferred that the blending ratio of the USY-type zeolite is, based on the total mass of the support composition, 0.1 to 10% by mass, and more preferred is 0.5 to 5% by mass. Still further, if the support composition includes a USY-type zeolite and alumina-boria, it is preferred that the blending ratio of the USY-type zeolite and the alumina-boria (USY-type zeolite/alumina-boria) is 0.03 to 1 by mass. Moreover, if the support composition includes a USY-type zeolite and silica-alumina, it is preferred that the blending ratio of the USY-type zeolite and the silica-alumina (USY-type zeolite/silica-alumina) is 0.03 to 1 by mass.

It is preferred that the temperature when calcining the support composition is in the range of 400 to 550° C., more preferred is in the range of 470 to 530° C., and even more preferred is in the range of 490 to 530° C. By calcining at such a temperature, sufficient solid acidity and mechanical strength can be imparted to the support.

It is preferred that the active metal that the hydrocracking catalyst A has is at least one selected from the group consisting of metals of group 6, group 8, group 9, and group 10 of the periodic table. Specific examples of these metals include noble metals such as platinum, palladium, rhodium, ruthenium, iridium, and osmium, or cobalt, nickel, molybdenum, tungsten, and iron. Preferred are platinum, palladium, nickel, cobalt, molybdenum, and tungsten, and more preferred are platinum and palladium. In addition, it is also preferred to use these metals in combinations of a plurality of species. In this case, examples of preferred combinations include platinum-palladium, cobalt-molybdenum, nickel-molybdenum, nickel-cobalt-molybdenum, and nickel-tungsten.

These active metals may be supported on the above-described support by a conventional method such as impregnation or ion exchange. Although there is no particular limitation on the amount of supported metal, it is preferred that the total amount of metal is 0.1 to 3.0% by mass based on the support mass. Here, the term "periodic table" refers to the long form periodic table of elements as stipulated by the IUPAC (the International Union of Pure and Applied Chemistry).

When the hydrocracking catalyst A is used, the hydrocracking reaction temperature can be set at, for example, 180 to 400° C., is preferably 200 to 370° C., more preferably 250 to 300° C., and especially preferably 280 to 350° C. If the reaction temperature is more than 400° C., not only does the yield of the base oil fraction decrease due to the base oil fraction being broken down into a light fraction, but the generated product is colored, so that usage as a fuel oil base tends to be limited. On the other hand, if the reaction temperature is less than 180° C., the hydrocracking reaction does not proceed sufficiently, so that the yield of the base oil fraction tends to decrease.

When the hydrocracking catalyst A is used, the hydrocracking hydrogen partial pressure may be set at, for example, 0.5 to 12 MPa, and is preferably 1.0 to 5.0 MPa. If the hydrogen partial pressure is less than 0.5 MPa, the hydrocracking tends not to proceed sufficiently. If the hydrogen partial pressure is more than 12 MPa, a high pressure resistance is required for the apparatus, so that equipment costs tend to increase.

When the hydrocracking catalyst A is used, the liquid hourly space velocity (LHSV) of the heavy fraction in the hydrocracking may be set at, for example, 0.1 to 10.0 h$^{-1}$, and is preferably 0.3 to 3.5 h$^{-1}$. If the LHSV is less than 0.1 h$^{-1}$, the hydrocracking tends to proceed excessively, and the productivity tends to decrease. If the LHSV is more than 10.0 h$^{-1}$, the hydrocracking tends not to proceed sufficiently.

When the hydrocracking catalyst A is used, the hydrogen/oil ratio in the hydrocracking may be set at, for example, 50 to 1,000 Nm$^3$/m$^3$, and is preferably 70 to 800 Nm$^3$/m$^3$. If the hydrogen/oil ratio is less than 50 Nm$^3$/m$^3$, the hydrocracking tends not to proceed sufficiently. If the hydrogen/oil ratio is more than 1,000 Nm$^3$/m$^3$, large-scale hydrogen supply apparatus and the like tend to be required.

When the hydrocarbon oil is a petroleum-derived hydrocarbon oil, sulfur content can be contained in the base oil fraction. In such a case, it is preferred to use, as a hydrocracking catalyst, a catalyst (hereinafter referred to as a "hydrocracking catalyst B") having a porous inorganic oxide that includes two or more elements selected from aluminum, silicon, zirconium, boron, titanium, and magnesium, and one or more metals selected from the elements of group 6, group 8, group 9, and group 10 of the periodic table that are supported on the porous inorganic oxide. According to the hydrocracking catalyst B, decrease in the catalytic activity due to sulfur poisoning is sufficiently suppressed.

As the support of the hydrocracking catalyst B, as described above, a porous inorganic oxide formed from two or more selected from aluminum, silicon, zirconium, boron, titanium, and magnesium can be used. Such a porous inorganic oxide is, from the perspective of enabling a much greater improvement in the hydrocracking activity, preferably an inorganic oxide that includes two or more selected from aluminum, silicon, zirconium, boron, titanium, and magnesium, and more preferably an inorganic oxide (a composite oxide of an aluminum oxide and another oxide) that includes aluminum and another element. The support of the hydrocracking catalyst B can also be the inorganic support that is a solid acid used for the above-described hydrocracking catalyst A.

If the porous inorganic oxide contains aluminum as a constituent element, the content of aluminum is preferably 1 to 97% by mass, more preferably 10 to 97% by mass, and even more preferably 20 to 95% by mass in terms of alumina, based on the total amount of the porous inorganic oxide. If the content of aluminum is less than 1% by mass in terms of alumina, physical properties such as the support acid properties are not preferable, and a sufficient hydrocracking activity tends not to be exhibited. On the other hand, if the content of aluminum is more than 97% by mass in terms of alumina, the catalyst surface area is insufficient and the activity tends to decrease.

The method for introducing silicon, zirconium, boron, titanium, and magnesium, which are constituent elements of the support other than aluminum, into the support is not especially limited. A solution containing these elements or the like may be used as a raw material. For example, there may be used, for silicon, silicon, liquid glass, and silica sol; for boron, boric acid; for phosphorus, phosphoric acid and an alkali metal salt of phosphoric acid; for titanium, titanium sulfide, titanium tetrachloride, and various alkoxide salts; and for zirconium, zirconium sulfate and various alkoxide salts.

Further, the porous inorganic oxide preferably contains phosphorus as a constituent element. The content of phosphorus is preferably 0.1 to 10% by mass, more preferably 0.5 to 7% by mass, and even more preferably 2 to 6% by mass based on the total amount of the porous inorganic oxide. If the content of phosphorus is less than 0.1% by mass, sufficient hydrocracking activity tends not to be exhibited, and if the content of phosphorus is more than 10% by mass, excessive cracking can proceed.

It is preferred to add the raw materials for the constituent components of the support other than the above-described aluminum oxide in a step before the calcining of the support. For example, the raw materials are added to an aluminum aqueous solution in advance and then an aluminum hydroxide gel containing these constituent components may be prepared or the raw materials may be added to the prepared aluminum hydroxide gel. Alternatively, the raw materials may be added in a step in which water or an acidic aqueous solution is added to a commercially available aluminum oxide intermediate or a boehmite powder, and the resulting mixture is kneaded. However, it is preferred that the raw materials are allowed to coexist during the stage of preparing the aluminum hydroxide gel. Although the mechanism for exhibiting the effect of the constituent components of the support other than aluminum oxide is not entirely understood, it is thought that the constituent components form a complex oxide state with aluminum, and that this causes an increase in the support surface area and interactions with the active metals to occur, thereby influencing the activity.

One or more metals selected from the elements of group 6, group 8, group 9, and group 10 of the periodic table is supported on the above-described porous inorganic oxide acting as a support. Among these metals, it is preferred to use a combination of two or more metals selected from cobalt, molybdenum, nickel, and tungsten. Examples of preferred combinations include cobalt-molybdenum, nickel-molybdenum, nickel-cobalt-molybdenum, and nickel-tungsten. Among these, more preferred is a combination of nickel-molybdenum, nickel-cobalt-molybdenum, and nickel-tungsten. During the hydrocracking, these metals are converted into a sulfide state to use.

As the content of the active metal based on the catalyst mass, the range of the total amount of tungsten and molybdenum supported is preferably 12 to 35% by mass, and more preferably 15 to 30% by mass, in terms of the oxide. If the total amount of tungsten and molybdenum supported is less than 12% by mass, the active sites decrease and sufficient activity tends not to be obtained. On the other hand, if the total amount of tungsten and molybdenum supported is more than 35% by mass, the metals are not effectively dispersed and sufficient activity tends not to be obtained. The range of the total amount of cobalt and nickel supported is preferably 1.0 to 15% by mass and more preferably 1.5 to 12% by mass in terms of the oxide. If the total amount of cobalt and nickel supported is less than 1.0% by mass, a sufficient co-catalyst effect is not obtained and the activity tends to decrease. On the other hand, if the total amount of cobalt and nickel supported is more than 15% by mass, the metals are not effectively dispersed and sufficient activity tends not to be obtained.

The method for incorporating these active metals into the catalyst is not especially limited. A known method that is applied when producing a general hydrocracking catalyst may be employed. Generally, it is preferred to employ a method in which a solution containing a salt of the active metal is impregnated into the catalyst support. In addition, an equilibrium adsorption method, a pore-filling method, an incipient-wetness method and the like can also be preferably employed. For example, a pore-filling method is a method in which the pore volume of a support is measured in advance and then the support is impregnated with the same volume of a metal salt solution. In addition, the impregnation method is not especially limited. The support may be impregnated by a suitable method based on the amount of the metal supported and the physical properties of the catalyst support.

In the present embodiment, the number of the hydrocracking catalyst B types to be used is not especially limited. For example, one type of catalyst may be used singly or a plurality of catalysts with different active metal species or support constituent components may be used. Examples of a suitable combination when using a plurality of different catalysts include a catalyst containing cobalt-molybdenum following on from a catalyst containing nickel-molybdenum, a catalyst containing nickel-cobalt-molybdenum following on from a catalyst containing nickel-molybdenum, a catalyst containing nickel-cobalt-molybdenum following on from a catalyst containing nickel-tungsten, and a catalyst containing cobalt-molybdenum following on from a catalyst containing nickel-cobalt-molybdenum. Prior to and/or following these combinations, a nickel-molybdenum catalyst may be further combined.

When combining a plurality of catalysts with different support components, a catalyst may be used that, for example, has an aluminum oxide content in the range of 80 to 99% by mass following on from a catalyst having an aluminum oxide content of 30% by mass or more and less than 80% by mass based on the total mass of the support.

Further, other than the hydrocracking catalyst B, a guard catalyst, a demetallization catalyst, and an inactive filler may optionally be used for the purpose of trapping the scale content which flows in along with the base oil fraction and supporting the hydrocracking catalyst B at the partition part of the catalyst bed as necessary. These may be used singly or in combinations thereof.

It is preferred that the pore volume of the hydrocracking catalyst B as measured by a nitrogen adsorption BET method is 0.30 to 0.85 ml/g, and more preferred is 0.45 to 0.80 ml/g. If the pore volume is less than 0.30 ml/g, the dispersibility of the supported metals is insufficient, and the active sites may decrease. In addition, if the pore volume is more than 0.85 ml/g, the catalyst strength is insufficient, so that the catalyst may turn into a powder and break up during use.

Further, it is preferred that the average pore size of the catalyst determined by a nitrogen adsorption BET method is 5 to 11 nm, and more preferred is 6 to 9 nm. If the average pore size is less than 5 nm, the reaction substrate is not sufficiently dispersed in the pores, and the reactivity may decrease. In addition, if the average pore size is more than 11 nm, the pore surface area decreases and the activity may become insufficient.

In addition, in the hydrocracking catalyst B, in order to maintain effective catalyst pores and exhibit sufficient activity, it is preferred that the ratio of the pore volume derived from pores having a pore diameter of 3 nm or less to the total pore volume is 35% by volume or less.

When the hydrocracking catalyst B is used, the hydrocracking conditions can be set to, for example, a hydrogen pressure of 2 to 13 MPa, a liquid hourly space velocity (LHSV) of 0.1 to 3.0 h$^{-1}$, and a hydrogen-oil ratio (hydrogen/oil ratio) of 150 to 1,500 Nm$^3$/m$^3$, are preferably a hydrogen pressure of 4.5 to 12 MPa, a liquid hourly space velocity of 0.3 to 1.5 h$^{-1}$, and a hydrogen-oil ratio of 380 to 1,200 Nm$^3$/m$^3$, and more preferably a hydrogen pressure of 6 to 15 MPa, a liquid hourly space velocity of 0.3 to 1.5 h$^{-1}$, and a hydrogen-oil ratio of 350 to 1,000 Nm$^3$/m$^3$. All of these conditions are factors having an influence on the reaction activity. For example, if the hydrogen pressure and the hydrogen-oil ratio are less than the above lower limits, the reactivity tends to decrease and the activity tends to rapidly decrease. On the other hand, if the hydrogen pressure and the hydrogen-oil ratio are more than the above upper limits, an excessive investment in equipment such as a compressor tends to be required. In addition, the lower the liquid hourly space velocity is, the more advantageous it tends to be for the reaction. However, if the liquid hourly space velocity is less than the above lower limit, a reactor having an extremely large internal volume is required and an excessive investment in equipment tends to be required. On the other hand, if the liquid hourly space velocity is more than the above upper limit, the reaction tends not to sufficiently proceed. Further, the reaction temperature may be 180 to 400° C., is preferably 200 to 370° C., more preferably 250 to 350° C., and especially preferably 280 to 350° C. If the reaction temperature is more than 400° C., not only does the yield of the base oil fraction decrease due to the base oil fraction being broken down into a light fraction, but the generated product is colored, so that usage as a fuel oil base tends to be limited. On the other hand, if the reaction temperature is less than 180° C., the hydrocracking reaction does not proceed sufficiently, so that the yield of the base oil fraction decreases.

Due to the hydrocracking, a part or all of the heavy fraction is converted into hydrocarbons having a lower boiling point than the heavy fraction. Further, in some cases a part of the heavy fraction is not sufficiently hydrocracked, and remains as an untracked heavy fraction.

The hydrocracked oil obtained by the hydrocracking of the heavy fraction changes its composition based on the hydrocracking catalyst and the hydrocracking reaction conditions. Here, unless otherwise stated, the "hydrocracked oil" refers to all the products of hydrocracking, including the uncracked heavy fraction. If the hydrocracking reaction conditions are severer than necessary, although the content of the uncracked heavy fraction in the hydrocracked oil decreases, a light fraction having a boiling point of 330° C. or less increases, and the yield of the preferred base oil fraction (330 to 520° C. fraction) decreases. On the other hand, if the hydrocracking reaction conditions are milder than necessary, the content of the uncracked heavy fraction increases, and the base oil fraction yield decreases.

In the present specification, when the lower limit of the base oil fraction boiling point range is $T_1$° C., the ratio $M_2/M_1$ of the mass $M_2$ of the cracking products having a boiling point of 25° C. to $T_1$° C. to the mass $M_1$ of all the cracking products having a boiling point of 25° C. or more is referred to as a "cracking ratio". In the hydrocracking of the heavy fraction, it is preferred to select the reaction conditions so that the cracking ratio $M_2/M_1$ is 5 to 70% (more preferably 10 to 60%, and even more preferably 20 to 50%).

The hydrocracked oil is returned to the first distillation step, and is again fractionated into a base oil fraction and a heavy fraction. The hydrocracked oil can be contained in the hydrocarbon oil subjected to the first distillation step in an amount of 5 to 95% by volume, and more preferably in an amount of 10 to 90% by volume. If more than 95% by volume is contained, the amount of base oil fraction per unit time that is supplied to the dewaxing step from the first distillation step is reduced, and the operating costs increase.

(Dewaxing Step)

In the dewaxing step, a dewaxed oil is obtained by isomerization and dewaxing of the base oil fraction fractionated in the first distillation step. The isomerization and dewaxing is carried out by, in the presence of hydrogen, bringing the base oil fraction into contact with a hydroisomerization catalyst.

As the hydroisomerization catalyst, a catalyst that is generally used for hydroisomerization, namely, a catalyst in which a metal having a hydrogenation activity is supported on an inorganic support, can be used.

As the metal having a hydrogenation activity in the hydroisomerization catalyst, one or more metals selected from the group consisting of metals of group 6, group 8, group 9, and group 10 of the periodic table are used. Specific examples of these metals include noble metals such as platinum, palladium, rhodium, ruthenium, iridium, and osmium, or cobalt, nickel, molybdenum, tungsten, and iron. Preferred are platinum, palladium, nickel, cobalt, molybdenum, and tungsten, and more preferred are platinum and palladium. In addition, it is also preferred to use these metals in combinations of a plurality of species. In this case, examples of preferred combinations include platinum-palladium, cobalt-molybdenum, nickel-molybdenum, nickel-cobalt-molybdenum, and nickel-tungsten.

Examples of inorganic supports constituting the hydroisomerization catalyst include metal oxides such as alumina, silica, titania, zirconia, and boria. These metal oxides may be one kind, a mixture of two or more kinds, or a composite metal oxide such as silica-alumina, silica-zirconia, alumina-zirconia, and alumina-boria. From the perspective of efficiently promoting the hydroisomerization of normal paraffins, the inorganic support is preferably a composite metal oxide that is a solid acid, such as silica-alumina, silica-zirconia, alumina-zirconia, and alumina-boric. Further, a small amount of zeolite may be included in the inorganic support. In order to improve the moldability and mechanical strength of the support, the inorganic support may be blended with a binder. Examples of preferred binders include alumina, silica, and magnesia.

As the content of the metal having a hydrogenation activity in the hydroisomerization catalyst, if this metal is the above-described noble metal, it is preferred that the content is about 0.1 to 3% by mass based on the mass of the support as metal atoms. Further, if this metal is a metal other than the above-described noble metals, it is preferred that the content is about 2 to 50% by mass based on the mass of the support as a metal oxide. If the content of the metal having a hydrogenation activity is less than the above-described lower limit, hydrorefining and hydroisomerization tend not to proceed sufficiently. On the other hand, if the content of the metal having a hydrogenation activity is more than the above-described upper limit, dispersion of the metal having a hydrogenation activity deteriorates, so that the activity of the catalyst tends to decrease, and the catalyst cost increases.

Further, the hydroisomerization catalyst may be a catalyst in which one or more metals selected from the elements of metals of group 6, group 8, group 9, and group 10 of the periodic table that is supported on a support including a porous inorganic oxide that is formed from a substance selected from aluminum, silicon, zirconium, boron, titanium, magnesium, and zeolite.

Examples of the porous inorganic oxide used as a support of such a hydroisomerization catalyst include alumina, titania, zirconia, boria, silica, or zeolite, and of these, preferred is a porous inorganic oxide formed from alumina and at least one of titania, zirconia, boria, silica, and zeolite. The production method is not especially limited, but an arbitrary preparation method may be employed that uses raw materials in the form of various sols or salt compounds corresponding to the respective elements. Furthermore, the support may be prepared by once preparing a composite hydroxide or a composite oxide, such as silica-alumina, silica-zirconia, alumina-titania, silica-titania, and alumina-boria, and then adding the composite hydroxide or composite oxide in the form of an alumina gel or other hydroxide, or in the form an appropriate solution, at an arbitrary stage of the preparation step. The proportion of alumina to the other oxide may be any ratio based on the support, but the content of alumina is preferably 90% by mass or less, more preferably 60% by mass or less, even more preferably 40% by mass or less, and preferably 10% by mass or more, and more preferably 20% by mass or more.

Examples of the zeolite, which is a crystalline alumino silicate, include faujasite, pentasil, mordenite, TON, MTT, and MRE. A zeolite that has been ultrastabilized by a predetermined hydrothermal treatment and/or acid treatment, or a zeolite whose alumina content has been adjusted may be used. It is preferred to use faujasite or mordenite, and especially preferred to use a Y or beta type. The Y type is preferably ultrastabilized. A zeolite ultrastabilized by a hydrothermal treatment has, in addition to its inherent pore structure, called micropores, of 20 angstroms or less, newly formed pores in the range of 20 to 100 angstroms. The hydrothermal treatment may be carried out under known conditions.

As the active metal of such a hydroisomerization catalyst, one or more metals selected from the elements of group 6, group 8, group 9, and group 10 of the periodic table can be used. Among these metals, preferably used are one or more metals selected from Pd, Pt, Rh, Ir, and Ni, and more preferably used is a combination thereof. Examples of a preferred combination include Pd—Pt, Pd—Ir, Pd—Rh, Pd—Ni, Pt—Rh, Pt—Ir, Pt—Ni, Rh—Ir, Rh—Ni, Ir—Ni, Pd—Pt—Rh, Pd—Pt—Ir, and Pt—Pd—Ni. Among these, more preferred combinations are Pd—Pt, Pd—Ni, Pt—Ni, Pd—Ir, Pt—Rh, Pt—Ir, Rh—Ir, Pd—Pt—Rh, Pd—Pt—Ni, and Pd—Pt—Ir, and even more preferred combinations are Pd—Pt, Pd—Ni, Pt—Ni, Pd—Ir, Pt—Ir, Pd—Pt—Ni, and Pd—Pt—Ir.

The total content of the active metals is preferably 0.1 to 2% by mass, more preferably 0.2 to 1.5% by mass, and even more preferably 0.5 to 1.3% by mass, in terms of metal, based on catalyst mass. If the total amount of metals supported is less than 0.1% by mass, the number of active sites is reduced, so that sufficient activity tends not to be obtained. On the other hand, if the total amount of metals supported is more than 2% by mass, the metals are not dispersed effectively, so that sufficient activity tends not to be obtained.

For any of the above-described hydroisomerization catalysts, the method for supporting the active metal on the support is not especially limited. A known method that is applied when producing a general hydroisomerization catalyst may be employed. Generally, it is preferred to employ a method in which a solution containing a salt of the active metal is impregnated into the catalyst support. In addition, an equilibrium adsorption method, a pore-filling method, an incipient-wetness method and the like can also be preferably employed. For example, a pore-filling method is a method in which the pore volume of a support is measured in advance and then the support is impregnated with the same volume of a metal salt solution. Although the impregnation method is not especially limited, the support may be impregnated by a suitable method based on the amount of the metal supported and the physical properties of the catalyst support.

As the hydroisomerization catalyst, the following catalyst can also be used.

<Specific Aspect of the Hydroisomerization Catalyst>

The hydroisomerization catalyst according to this aspect is imparted with its characteristics as a result of being produced by a specific method. The hydroisomerization catalyst according to the present aspect will now be described with reference to a preferred production aspect thereof.

The method for producing the hydroisomerization catalyst according to the present aspect includes a first step of obtaining a support precursor by heating a mixture that includes an ion-exchanged zeolite obtained by ion-exchanging an organic template-containing zeolite that contains an organic template and has a one-dimensional porous structure including a 10-membered ring in a solution containing ammonium ions and/or protons, and a binder, in a $N_2$ atmosphere at a temperature of 250 to 300° C., and a second step of obtaining a hydroisomerization catalyst in which platinum and/or palladium is supported on a support including zeolite by calcining a catalyst precursor incorporating a platinum salt and/or palladium salt in the support precursor in an atmosphere containing molecular oxygen at a temperature of 350 to 400° C.

From the perspective of achieving a high level of both high isomerization activity and suppressed cracking activity in the hydroisomerization reactions of normal paraffins, the organic template-containing zeolite used in the present aspect has a one-dimensional pore structure formed from a 10-membered ring. Examples of such zeolites include AEL, EUO, FEIN, HEU, MEL, MFI, NES, TON, MTT, WEI, *MRE, and SSZ-32. The above three-lettered acronyms represent framework-type codes assigned to various structures of classified molecular sieve-type zeolites by the Structure Commission of the International Zeolite Association. It is also noted that zeolites having the same topology are collectively designated by the same code.

Among the above-described zeolites having a one-dimensional porous structure including a 10-membered ring, from the perspective of high isomerization activity and low cracking activity, preferred as the organic template-containing zeolite are zeolites having a TON or an MTT structure, zeolite ZSM-48, which is a zeolite having a *MRE structure, and zeolite SSZ-32. Zeolite ZSM-22 is more preferred among zeolites having the TON structure, and zeolite ZSM-23 is more preferred among zeolites having the MTT structure.

The organic template-containing zeolite is hydrothermally synthesized according to a known method from a silica source, an alumina source, and an organic template that is added to build the above-described predetermined pore structure.

The organic template is an organic compound having an amino group, an ammonium group and the like, and is selected according to the structure of the zeolite to be synthesized. However, it is preferred that the organic template is an amine derivative. Specifically, the organic template is preferably at least one selected from the group consisting of alkylamines, alkyldiamines, alkyltriamines, alkyltetramines, pyrrolidine, piperazine, aminopiperazine, alkylpentamines, alkylhexamines, and their derivatives. The carbon number of above alkyl group may be 4 to 10, preferably 6 to 8. Typical examples of the alkyldiamines include 1,6-hexanediamine and 1,8-diaminooctane.

The molar ratio of the silicon element to aluminum element ([Si]/[Al]; hereinafter referred to as a "Si/Al ratio") that constitute the organic template-containing zeolite having a one-dimensional porous structure including a 10-membered ring is preferably 10 to 400, and more preferably 20 to 350. If the Si/Al ratio is less than 10, although the activity for the conversion of normal paraffins increases, the isomerization selectivity to isoparaffins decreases, and cracking reactions caused by an increase in the reaction temperature tend to sharply increase, which is undesirable. Conversely, if the Si/Al ratio is more than 400, the catalytic activity needed for the conversion of normal paraffins cannot be easily obtained, which is undesirable.

The synthesized organic template-containing zeolite, which has preferably been washed and dried, typically has alkali metal cations as counter cations, and incorporates the organic template in its pore structure. The zeolite containing an organic template, which is used for producing the hydroisomerization catalyst according to the present invention, is preferably in such a synthesized state, i.e., preferably, the zeolite has not been subjected to a calcining treatment for removing the organic template incorporated therein.

The organic template-containing zeolite is next ion-exchanged in a solution containing ammonium ions and/or protons. By the ion-exchange treatment, the counter cations contained in the organic template-containing zeolite are exchanged for ammonium ions and/or protons. Further, at the same time, a portion of the organic template incorporated in the organic template-containing zeolite is removed.

The solution used for the ion-exchange treatment is preferably a solution that uses a solvent containing at least 50% by volume of water, and more preferably is an aqueous solution. Examples of compounds for supplying ammonium ions into the solution include various inorganic and organic ammonium salts, such as ammonium chloride, ammonium sulfate, ammonium nitrate, ammonium phosphate, and ammonium acetate. On the other hand, mineral acids such as hydrochloric acid, sulfuric acid, and nitric acid are typically used as compounds for supplying protons into the solution. The ion-exchanged zeolite (here, an ammonium-form zeolite) obtained by ion exchange of the organic template-containing zeolite in the presence of ammonium ions releases ammonia during subsequent calcination, and the counter cations are converted into protons to form Bronsted acid sites. Ammonium ions are preferred as the cationic species used for the ion exchange. The amount of ammonium ions and/or protons contained in the solution is preferably set to 10 to 1,000 equivalents based on the total amount of the counter cations and organic template contained in the organic template-containing zeolite used.

The ion-exchange treatment may be performed on the organic template-containing zeolite support in powder form, or alternatively, prior to the ion-exchange treatment, the organic template-containing zeolite may be blended with an inorganic oxide, which is a binder, and extruded, and the ion-exchange treatment may be performed on the resulting extruded body. However, if the extruded body is subjected to the ion-exchange treatment in an uncalcined state, problems such as the extruded body collapsing and turning into a powder tend to occur. Therefore, it is preferred to subject the organic template-containing zeolite in powder form to an ion-exchange treatment.

The ion-exchange treatment is preferably performed based on a standard method, i.e., a method in which the zeolite containing an organic template is dipped in a solution, preferably an aqueous solution, containing ammonium ions and/or protons, and the solution is stirred or fluidized. It is preferred to perform the stirring or fluidization under heating to increase the ion-exchange efficiency. In the present aspect, especially preferred is a method in which the aqueous solution is heated, boiled, and ion-exchanged under reflux.

Further, from the perspective of increasing the ion-exchange efficiency, during the ion exchange of the zeolite in a solution, it is preferred to exchange the solution with a fresh one once or twice or more, and more preferably exchanged with a fresh one once or twice. When exchanging the solution once, the ion-exchange efficiency can be improved by, for example, dipping the organic template-containing zeolite in a solution containing ammonium ions and/or protons, and heating the solution under reflux for 1 to 6 hours, followed by exchanging the solution with a fresh one, and further heating under reflux for 6 to 12 hours.

By the ion-exchange treatment, substantially all of the counter cations such as an alkali metal in the zeolite can be exchanged for ammonium ions and/or protons. On the other hand, regarding the organic template incorporated in the zeolite, although a portion of the organic template is removed by the ion-exchange treatment, it is generally difficult to remove all of the organic template even if the ion-exchange treatment is repeatedly performed, so that a portion of the organic template remains inside the zeolite.

In the present aspect, a support precursor is obtained by heating a mixture in which the ion-exchanged zeolite and the binder are included in a nitrogen atmosphere at a temperature of 250 to 350° C.

The mixture in which the ion-exchanged zeolite and the binder are included is preferably obtained by blending an inorganic oxide, which is a binder, with the ion-exchanged zeolite obtained by the above-described method, and extruding the resulting composition to form a extruded body. The purpose of blending an inorganic oxide with the ion-exchanged zeolite is to increase the mechanical strength of the support (in particular, a particulate support) obtained by calcining the excluded body to a degree that can withstand practical applications. However, the present inventor found that the selection of the type of inorganic oxide affects the isomerization selectivity of the hydroisomerization catalyst. From this perspective, at least one inorganic oxide selected from alumina, silica, titania, boria, zirconia, magnesia, ceria, zinc oxide, phosphorus oxide, and a composite oxide containing a combination of two or more of these oxides can be used as the inorganic oxide. Among the above, silica and alumina are preferred, and alumina is more preferred, from the perspective of further improving the isomerization selectivity of the hydroisomerization catalyst. The phrase "composite oxide containing a combination of two or more of these oxides" refers to a composite oxide containing at least two components from alumina, silica, titania, boria, zirconia, magnesia, ceria, zinc oxide, and phosphorus oxide, but is preferably an alumina-based composite oxide containing 50% by mass or more of an alumina component based on the composite oxide, and among those, is more preferably alumina-silica.

The blending ratio of the ion-exchanged zeolite and the inorganic oxide in the above-described composition is preferably 10:90 to 90:10, and more preferably 30:70 to 85:15, in terms of the mass ratio of the ion-exchanged zeolite to the inorganic oxide. If this ratio is less than 10:90, the activity of the hydroisomerization catalyst tends to be insufficient, which is undesirable. Conversely, if the ratio is more than 90:10, the mechanical strength of the support obtained by extruding and calcining the composition tends to be insufficient, which is undesirable.

Although the method for blending the inorganic oxide with the ion-exchanged zeolite is not especially limited, a general method can be employed, such as, for example, a method in which a suitable amount of a liquid such as water is added to the powders of both components to form a viscous fluid, and the fluid is kneaded in a kneader or the like.

The composition containing the ion-exchanged zeolite and inorganic oxide, or a viscous fluid including the composition, is extruded by a method such as extrusion, and is preferably dried, to form a particulate extruded body. Although the shape of the extruded body is not especially limited, examples of the shape include a cylindrical shape, a pellet shape, a spherical shape, and an irregular tubular shape having a three leaf shaped or a four leaf shaped cross-section. Although the size of the extruded body is not especially limited, the extruded body is preferably, for example, about 1 to 30 mm in the long axis, and about 1 to 20 mm in the short axis, from the perspective of the ease of handling, the load density in the reactor and the like.

In the present aspect, it is preferred to form the support precursor by heating the thus-obtained extruded body in a $N_2$ atmosphere at a temperature of 250 to 350° C. Regarding the heating time, preferred is 0.5 to 10 hours, and more preferred is 1 to 5 hours.

In the present aspect, if the above-described heating temperature is less than 250° C., a large amount of organic template remains, and the zeolite pores become blocked with the remaining template. The isomerization active sites are thought to exist near the pore mouth. Thus, in the above case, the reaction substrate cannot disperse into the pores due to the pore blockage, so that the active sites become covered, the isomerization reaction does not easily proceed, and a normal paraffin conversion rate tends not to be sufficiently obtained. On the other hand, if the heating temperature is more than 350° C., the isomerization selectivity of the obtained isomerization catalyst does not sufficiently improve.

It is preferred that the lower limit for the temperature when forming the support precursor by heating the extruded body is 280° C. or more, and that the upper limit for the temperature is 330° C. or less.

In the present aspect, it is preferred to heat the above-described mixture so that a portion of the organic template included in the extruded body remains. Specifically, it is preferred to set the heating conditions so that the carbon content of the hydroisomerization catalyst obtained by calcination after metal supporting, which will be described below, is 0.4 to 3.5% by mass (preferably 0.4 to 3.0% by mass, more preferably 0.4 to 2.5% by mass), the micropore volume per unit mass of the catalyst is 0.02 to 0.12 cc/g, and the micropore volume per unit mass of the zeolite that is contained in the catalyst is 0.01 to 0.12 cc/g.

Next, the catalyst precursor incorporating a platinum salt and/or palladium salt in the above-described support precursor is calcined in an atmosphere containing molecular oxygen at a temperature of 350 to 400° C., preferably 380 to 400° C., and more preferably 400° C., to obtain a hydroisomerization catalyst in which a platinum and/or palladium is supported on a support including zeolite. Here, "in an atmosphere containing molecular oxygen" means bringing into contact with a gas including oxygen gas, and of those preferably air. The calcining time is preferably 0.5 to 10 hours, and more preferably 1 to 5 hours.

Examples of the platinum salt include chloroplatinic acid, tetraammineplatinum dinitrate, dinitroaminopiatinum, and tetraamminedichloroplatinum. Since chloride salts can produce hydrochloric acid during a reaction, which may cause apparatus corrosion, tetraammineplatinum dinitrate, which is a platinum salt that is not a chloride salt and in which a high level of platinum is dispersed, is preferred.

Examples of the palladium salt include palladium chloride, tetraammine palladium nitrate, and diaminopalladium nitrate. Since chloride salts can produce hydrochloric acid during a reaction, which may cause apparatus corrosion, tetraammine palladium nitrate, which is a palladium salt that is not a chloride salt and in which a high level of palladium is dispersed, is preferred.

The amount of the active metal supported on the support including zeolite according to the present aspect is preferably 0.001 to 20% by mass, and more preferably 0.01 to 5% by mass, based on the mass of the support. If the amount supported is less than 0.001% by mass, it is difficult to impart a predetermined hydrogenation/dehydrogenation function to the catalyst. Conversely, if the amount supported is more than 20% by mass, conversion on the active metal of hydrocarbons into lighter products by cracking tends to proceed, so that the yield of the intended fraction tends to decrease, and the catalyst costs tend to increase, which are undesirable.

Further, when the hydroisomerization catalyst according to the present aspect is used for hydroisomerization of a hydrocarbon oil containing many sulfur-containing compounds and/or nitrogen-containing compounds, from the perspective of the durability of catalytic activity, it is preferred that the active metals are a combination such as nickel-cobalt, nickel-molybdenum, cobalt-molybdenum, nickel-molybdenum-cobalt, or nickel-tungsten-cobalt. It is preferred that the amount of these metals supported is 0.001 to 50% by mass, and more preferably 0.01 to 30% by mass, based on the mass of the support.

In the present aspect, it is preferred to calcine the above-described catalyst precursor so that the organic template remaining in the support precursor remains. Specifically, it is preferred to set the heating conditions so that the carbon content of the obtained hydroisomerization catalyst is 0.4 to 3.5% by mass (preferably 0.4 to 3.0% by mass, more preferably 0.4 to 2.5% by mass), the micropore volume per unit mass of the catalyst is 0.02 to 0.12 cc/g, and the micropore volume per unit mass of the zeolite that is contained in the catalyst is 0.01 to 0.12 cc/g. The carbon content of the hydroisomerization catalyst is measured by "combustion in oxygen gas flow—infrared absorption method". Specifically, the catalyst is combusted in the oxygen gas flow to generate carbon dioxide gas and the carbon content is determined based on an infrared absorption amount of the carbon dioxide gas. Analysis equipments for carbon-sulfur (for example, EMIA-920V manufactured by HORIBA, Ltd.) are used for the measurement.

The micropore volume per unit mass of the hydroisomerization catalyst is calculated by a method called nitrogen adsorption measurement. Namely, for the catalyst, the micropore volume per unit mass of the catalyst is calculated by analyzing a physical adsorption and desorption isotherm of nitrogen measured at the temperature of liquid nitrogen (−196° C.), specifically, analyzing an adsorption isotherm of nitrogen measured at the temperature of liquid nitrogen (−196° C.) by a t-plot method. Further, the micropore volume per unit mass of the zeolite contained in the catalyst is also calculated by the above-described nitrogen adsorption measurement.

A micropore volume $V_z$ per unit mass of the zeolite contained in the catalyst can be calculated, for example, if the binder does not have a micropore volume, based on the following expression from a value $V_c$ of the micropore volume per unit mass of the hydroisomerization catalyst and the content $M_z$ (% by mass) of zeolite in the catalyst.

$$V_z = V_c/M_z \times 100$$

It is preferred that, subsequent to the calcination treatment, the hydroisomerization catalyst of the present aspect is subjected to a reduction treatment after the catalyst is loaded in the reactor for conducting the hydroisomerization reaction. Specifically, it is preferred that the hydroisomerization catalyst is subjected to the reduction treatment for about 0.5 to 5 hours in an atmosphere containing molecular hydrogen, and preferably under a stream of hydrogen gas, preferably at 250 to 500° C., and more preferably at 300 to 400° C. By performing this step, it can be further ensured that high activity for the dewaxing of the hydrocarbon oil can be imparted to the catalyst.

The hydroisomerization catalyst according to the present aspect is a hydroisomerization catalyst containing a support that includes a zeolite having a one-dimensional porous structure including a 10-membered ring and a binder, and platinum and/or palladium supported on the support, in which the carbon content of the catalyst is 0.4 to 3.5% by mass and the micropore volume per unit mass of the catalyst is 0.02 to 0.12 cc/g. Further, this zeolite is preferably a zeolite derived from ion-exchanged zeolite obtained by ion-exchanging an organic template-containing zeolite that contains an organic template and has a one-dimensional porous structure including a 10-membered ring in a solution containing ammonium ions and/or protons, in which the micropore volume per unit mass of the zeolite contained in the catalyst is 0.01 to 0.12 cc/g.

The above-described hydroisomerization catalyst can be produced by the method described above. The carbon content of the catalyst, the micropore volume per unit mass of the catalyst and the micropore volume per unit mass of the zeolite contained in the catalyst can be set to be within the above-described ranges by appropriately adjusting the amount of ion-exchanged zeolite blended in the mixture including the ion-exchanged zeolite and a binder, the heating conditions of the mixture in a $N_2$ atmosphere, and the heating conditions of the catalyst precursor in the atmosphere containing molecular oxygen.

In the dewaxing step, the reaction temperature of the isomerization and dewaxing is preferably 200 to 450° C., and more preferably 220 to 400° C. If the reaction temperature is less than 200° C., the isomerization of the normal paraffins contained in the base oil fraction tends not to easily proceed, so that the reduction and removal of the wax component tend to be insufficient. Conversely, if the reaction temperature is more than 450° C., cracking of the base oil fraction is significant, so that the yield of the lubricant base oil tends to decrease.

The reaction pressure in the isomerization and dewaxing is preferably 0.1 to 20 MPa, and more preferably 0.5 to 15 MPa. If the reaction pressure is less than 0.1 MPa, catalyst degradation due to the formation of coke tends to be accelerated. Conversely, if the reaction pressure is more than 20 MPa, construction costs for the apparatus increase, so that it tends to become difficult to realize an economical process.

The liquid hourly space velocity of the base oil fraction based on the catalyst in the isomerization and dewaxing is preferably 0.01 to 100 h$^{-1}$, and more preferably 0.1 to 50 h$^{-1}$. If the liquid hourly space velocity is less than 0.01 h$^{-1}$, the cracking of the base oil fraction tends to proceed excessively, so that production efficiency tends to decrease. Conversely, if the liquid hourly space velocity is more than 100 h$^{-1}$, the isomerization of the normal paraffins contained in the base oil fraction tends not to proceed easily, so that the reduction and removal of the wax component tend to be insufficient.

The supply ratio of hydrogen to base oil fraction in the isomerization and dewaxing is preferably 100 to 1,000 Nm$^3$/m$^3$, and more preferably 200 to 800 Nm$^3$/m$^3$. If the supply ratio is less than 100 Nm$^3$/m$^3$, for example, when the base oil fraction contains sulfur or nitrogen content, hydrogen sulfide and ammonia gas produced by desulfurization and denitrification reactions that accompany the isomerization reaction are adsorbed onto and poison the active metal on the catalyst, which tends to make it difficult to achieve a predetermined catalytic performance. Conversely, if the supply ratio is more than 1,000 Nm$^3$/m$^3$, hydrogen supply equipment having an increased capacity is required, which tends to make it difficult to realize an economical process.

It is preferred that the dewaxed oil obtained by the dewaxing step has a normal paraffin concentration of 10% by volume or less, and more preferably 1% by volume or less.

The dewaxed oil obtained by the dewaxing step in the present embodiment can be preferably used as a lubricant base oil raw material. In the present embodiment, for example, the lubricant base oil can be obtained by a hydrorefining step of obtaining a hydrorefined oil by hydrorefining the dewaxed oil obtained in the second step, and a second distillation step of obtaining a lubricant base oil by fractionating the hydrorefined oil.

(Hydrorefining Step)

In the hydrorefining step, a hydrorefined oil is obtained by hydrorefining the dewaxed oil obtained in the second step. By hydrorefining, for example, the olefins and aromatic compounds in the dewaxed oil are hydrogenated, so that the oxidation stability and the color hue of the lubricant are improved. Further, sulfur compounds in the dewaxed oil are hydrogenated, so that a decrease in the sulfur content can also be expected.

The hydrorefining is carried out by, in the presence of hydrogen, bringing the dewaxed oil into contact with a hydrorefining catalyst. Examples of the hydrorefining catalyst include catalysts that include a support including one or more inorganic solid acidic substances selected from alumina, silica, zirconia, titania, boria, magnesia, and phosphorus, and one or more active metals selected from the group consisting of platinum, palladium, nickel-molybdenum, nickel-tungsten, and nickel-cobalt-molybdenum that is supported on the support.

A preferred support is an inorganic solid acidic substance that includes at least two or more of alumina, silica, zirconia, or titania.

As the method for supporting the active metals on the support, a conventional method such as impregnation or ion exchange may be employed.

The amount of the active metals supported in the hydrorefining catalyst is preferably such that the total amount of metal is 0.1 to 25% by mass based on the support.

The average pore size of the hydrorefining catalyst is preferably 6 to 60 nm, and more preferably 7 to 30 nm. If the average pore size is less than 6 nm, a sufficient catalytic activity tends not to be obtained, while if the average pore size is more than 60 nm, catalytic activity tends to decrease due to a decrease in the level of dispersion of the active metals.

It is preferred that the pore volume of the hydrorefining catalyst is 0.2 mL/g or more. If the pore volume is less than 0.2 mL/g, degradation of the activity of the catalyst tends to occur earlier. Further, the pore volume of the hydrorefining catalyst may be 0.5 mL/g or less, for example. In addition, it is preferred that the specific surface area of the hydrorefining catalyst is 200 $m^2/g$ or more. If the specific surface area of the catalyst is less than 200 $m^2/g$, the dispersibility of the active metals is insufficient, so that activity tends to decrease. Still further, the specific surface area of hydrorefining catalyst may be 400 $m^2/g$ or less, for example. The pore volume and the specific surface area of the catalyst can be measured and calculated by a BET method using nitrogen adsorption.

It is preferred that the hydrorefining reaction conditions are set to, for example, a reaction temperature of 200 to 300° C., a hydrogen partial pressure of 3 to 20 MPa, an LHSV of 0.5 to 5 $h^{-1}$, and a hydrogen/oil ratio of 170 to 850 $Nm^3/m^3$, and more preferred are a reaction temperature of 200 to 300° C., a hydrogen partial pressure of 4 to 18 MPa, an LHSV of 0.5 to 4 $h^{-1}$, and a hydrogen/oil ratio of 340 to 850 $Nm^3/m^3$.

In the present embodiment, it is preferred to adjust the reaction conditions so that the sulfur and nitrogen content in the hydrorefined oil is 5 ppm by mass or less and 1 ppm by mass or less, respectively. The sulfur content is a value measured based on JIS K2541 "Crude oil and petroleum products—Determination of sulfur content," and the nitrogen content is a value measured based on JIS K2609 "Crude petroleum and petroleum products—Determination of nitrogen content."

(Second Distillation Step)

In the second distillation step, the hydrorefined oil is fractionated to obtain a lubricant base oil.

The distillation conditions in the second distillation step are not especially limited, as long as the conditions allow the hydrorefined oil to be fractionated into the light fractions and the lubricant fraction. For example, it is preferred that the second distillation step is carried out by atmospheric distillation for distilling away the light fractions from the hydrorefined oil, and vacuum distillation for fractionating each lubricant fraction from the bottom oil of the atmospheric distillation.

In the second distillation step, for example, a plurality of lubricant fractions are obtained by setting a plurality of cut points and performing vacuum distillation of a bottom oil obtained by atmospheric distillation of the hydrorefined oil. In the second distillation step, for example, a first lubricant fraction that has a boiling point of 330 to 410° C. at atmospheric pressure, a second lubricant fraction that has a boiling point of 410 to 470° C., and a third lubricant fraction that has a boiling point of 470 to 520° C. can each be fractionated and collected from the hydrorefined oil.

The first lubricant fraction can be acquired as a lubricant base oil that is suited for ATF and shock absorbers. In this case, it is preferred that the kinematic viscosity at 100° C. is 2.7±0.1 cSt. The second lubricant fraction can be acquired as the lubricant base oil according to the present invention that is suited as an engine oil base oil satisfying the API Group III and III+ standards. In this case, it is preferred that the kinematic viscosity at 100° C. is 4.0±0.1 $mm^2/s$, and that the pour point is −22.5° C. or less. The third lubricant fraction can be acquired as a lubricant base oil that is suited as an industrial hydraulic oil. In this case, it is preferred that the kinematic viscosity at 40° C. is 32 $mm^2/s$ or more. Further, the first lubricant fraction can be acquired as a lubricant base oil corresponding to 70 Pale, the second lubricant fraction can be acquired as a lubricant base oil corresponding to SAE-10, and the third lubricant fraction can be acquired as a lubricant base oil corresponding to SAE-20.

In addition, light fractions, such as naphtha or kerosene and gas oil, produced as a byproduct along with the hydroisomerization and hydrocracking is included in the hydrorefined oil obtained in the hydrorefining step. In the second distillation step, these light fractions can be collected as a fraction having a boiling point of 330° C. or less, for example.

Further, in the present embodiment, the lubricant base oil can also be obtained by a second distillation step of obtaining a lubricant fraction by fractionating the dewaxed oil obtained in the second step, and a hydrorefining step of hydrorefining the lubricant fraction. In this case, the second distillation step and the hydrorefining step can be carried out in the same manner as the above-described second distillation step and hydrorefining step.

Next, a preferred embodiment of the present invention will be described with reference to the drawing.

FIG. 1 is a flow diagram illustrating an example of a lubricant base oil production apparatus for carrying out the method for producing a lubricant base oil according to the present invention. A lubricant base oil production apparatus 100 illustrated in FIG. 1 includes a flow channel L1 into which a hydrocarbon oil as a feedstock is introduced, a first distillation tower 10 for atmospheric distillation of the feedstock introduced from the flow channel L1, a second distillation tower 20 for vacuum distillation of a bottom oil that is supplied from the first distillation tower 10 via a flow channel L3, flow channels L41, L42, and L43 for each extracting from the second distillation tower a base oil fraction fractionated based on the desired lubricant base oil, storage tanks T1, T2, and T3 that respectively store a base oil fraction supplied via the flow channels L41, L42, and L43, flow channels L44, L45, and L46 for extracting the respective base oil fractions from the storage tanks T1, T2, and T3, a flow channel L47 for subjecting a base oil fraction supplied via the flow channels L44, L45, and L46 to a later stage, a first reactor 30 for isomerization and dewaxing of the base oil fraction supplied via the flow channel L47, a second reactor 40 for hydrocracking a heavy fraction supplied from the second distillation tower 20 via a flow channel L5, a flow channel L6 that merges the hydrocracked oil hydrocracked in the second reactor 40 in the flow channel L1, a third reactor 50 for hydrorefining a dewaxed oil supplied from the first reactor 30 via a flow channel L7, a third distillation tower 60 for atmospheric distillation of the hydrorefined oil supplied from the third reactor 50 via a flow channel L8, and a fourth distillation tower 70 for vacuum distillation of the bottom oil supplied from the third distillation tower 60 via a flow channel L11.

A flow channel L2 for extracting the light fractions that are lighter than the base oil fraction out of the system is provided in the first distillation tower 10.

In the second distillation tower 20, the flow channels L41, L42, and L43 are provided for each extracting a base oil fraction fractionated based on the desired lubricant base oil, and the base oil fractions extracted from the flow channels L41, L42, and L43 are stored in the storage tanks T1, T2, and T3, respectively. The base oil fractions stored in the storage tanks T1, T2, and T3 are extracted from the flow channels L44, L45, and L46, respectively, and subjected to a later stage via the flow channel L47. In the lubricant base oil production apparatus 100, the base oil fractions stored in the storage tanks T1, T2, and T3 can each be supplied to the later stage first reactor 30 either independently or mixed together. From an energy saving perspective, the base oil fraction extracted from the flow channels L41, L42, or L43 may also be directly supplied to the first reactor 30 for isomerization and dewaxing from the flow channel L47 via the flow channels L44, L45, or L46 without storing in the storage tanks T1, T2, and T3.

Flow channels L9 and L10 for extracting the fractions (e.g., the naphtha and fuel oil fractions) that are lighter than the fraction (lubricant fraction) useful as a lubricant base oil are provided in the third distillation tower 60. Flow channels L12 to L14 for extracting predetermined lubricant fractions out of the system are provided in the fourth distillation tower 70.

The first distillation step of fractionating the base oil fraction and the heavy fraction from the hydrocarbon oil is carried out in the lubricant base oil production apparatus 100 by the first distillation tower 10 and the second distillation tower 20.

In the lubricant base oil production apparatus 100, at the first distillation tower 10, a light fraction can be extracted from the flow channel L2 and the base oil fraction and heavy fraction can be extracted as bottom oil from the flow channel L3 by atmospheric distillation of the hydrocarbon oil supplied from the flow channel L1.

At the second distillation tower 20, the base oil fraction and the heavy fraction can be each fractionated by vacuum distillation of the bottom oil (base oil fraction and heavy fraction) supplied from the flow channel L3. The base oil fraction is, for example, fractionated into a first base oil fraction having a boiling point of 330 to 410° C. under atmospheric pressure, a second base oil fraction having a boiling point of 410 to 470° C., and a third base oil fraction having a boiling point of 470 to 520° C., and each fraction is extracted from the flow channels L41, L42, and L43 and stored in the storage tanks T1, T2, and T3. The heavy fraction is extracted from the flow channel L5, and supplied to the second reactor 40.

In the lubricant base oil production apparatus 100, although the first distillation step is carried out by the first distillation tower 10 and the second distillation tower 20, the first distillation step can also be carried out by, for example, a single distillation tower that performs vacuum distillation, or carried out by three or more distillation towers. Further, in the lubricant base oil production apparatus 100, although the base oil fraction is fractionated into three fractions by the second distillation tower 20, in the first distillation step, the base oil fraction may also be extracted as a single fraction, or extracted by fractionating into two or four or more fractions.

In the lubricant base oil production apparatus 100, the heavy fraction supplied from the second distillation tower 20 via the flow channel L5 is hydrocracked by the second reactor 40. The hydrocracked oil hydrocracked by the second reactor 40 is merged with the hydrocarbon oil flowing through the flow channel L1 via the flow channel L6, and is supplied to the first distillation tower 10.

The form of the second reactor 40 is not especially limited. For example, a fixed-bed flow reactor loaded with a hydrocracking catalyst can be preferably used. The reactor may be a single apparatus, or an apparatus in which a plurality of reactors are arranged in series or in parallel. Further, the catalyst bed in the reactor may be a single bed or a plurality of beds.

In the present embodiment, for example, the hydrocracking can be carried out by loading a hydrocracking catalyst in the second reactor 40, which is a fixed-bed flow reactor, and flowing hydrogen (molecular hydrogen) and the heavy fraction through the second reactor 40.

The dewaxing step is a step of obtaining a dewaxed oil by isomerization and dewaxing of the base oil fraction fractionated in the first distillation step. In the lubricant base oil production apparatus 100, the dewaxing step can be carried out by the first reactor 30. In the first reactor 30, in the presence of hydrogen (molecular hydrogen), the base oil fraction fractionated by the second distillation tower 20 is brought into contact with a hydroisomerization catalyst. Consequently, the base oil fraction is dewaxed by hydroisomerization.

The form of the first reactor 30 is not especially limited. For example, a fixed-bed flow reactor loaded with a hydroisomerization catalyst can be preferably used. The reactor may be a single apparatus, or an apparatus in which a plurality of reactors are arranged in series or in parallel. Further, the catalyst bed in the reactor may be a single bed or a plurality of beds.

In the present embodiment, for example, the hydroisomerization can be carried out by loading a hydroisomerization catalyst in the first reactor 30, which is a fixed-bed flow reactor, and flowing hydrogen (molecular hydrogen) and the base oil fraction through the reactor.

In the lubricant base oil production apparatus 100, the hydrorefining step can be carried out by the third reactor 50. In the third reactor 50, the dewaxed oil supplied via the flow channel L7 from the first reactor 30 is hydrorefined.

The form of the third reactor 50 is not especially limited. For example, a fixed-bed flow reactor loaded with a hydrorefining catalyst can be preferably used. The reactor may be a single apparatus, or an apparatus in which a plurality of reactors are arranged in series or in parallel. Further, the catalyst bed in the reactor may be a single bed or a plurality of beds.

In the present embodiment, for example, the hydrorefining can be carried out by loading a hydrorefining catalyst in the third reactor 50, which is a fixed-bed flow reactor, and flowing hydrogen (molecular hydrogen) and the dewaxed oil through the reactor.

In the lubricant base oil production apparatus 100, the second distillation step of obtaining a lubricant base oil by fractionating the hydrorefined oil can be carried out by the third distillation tower 60 and the fourth distillation tower 70. In the third distillation tower 60, the fractions (e.g., the naphtha and fuel oil fractions) that are lighter than the fraction lubricant useful as a lubricant base oil are extracted from the flow channels L9 and L10, and the bottom oil is extracted from the flow channel L11, by atmospheric distillation of the hydrorefined oil.

In the fourth distillation tower, a desired lubricant fraction can be obtained by vacuum distillation of the bottom oil supplied from the flow channel L11. In the fourth distillation tower 70, a plurality of lubricant fractions can be each extracted from the flow channels L12, L13, and L14 by setting a plurality of cut points and performing vacuum distillation of the bottom oil supplied from the flow channel L11. In the present embodiment, for example, a first lubricant fraction that has a boiling point of 330 to 410° C. at atmospheric pressure, a second lubricant fraction that has a boiling point of 410 to 470° C., and a third lubricant fraction that has a boiling point of 470 to 520° C. can be extracted from the flow channels L12 to L14, respectively, and collected as a lubricant base oil.

Although a preferred embodiment of the present invention was described above, the present invention is not limited to the above-described embodiment.

EXAMPLES

Although the present invention will now be described more specifically based on the following Examples, the present invention is not limited to the Examples.

(Preparation of Hydrocracking Catalyst A-1)
<Support Preparation>

A kneaded product was prepared by adding water into a mixture of 47% by mass of silica-alumina, 3% by mass of USY zeolite, and 50% by mass of alumina binder, and kneading the resultant mixture into a clay-like state. This kneaded product was extruded into a columnar shape having a diameter of about 1.5 mm and a length of about 3 mm by extrusion extruding. The obtained extruded body was dried for 3 hours at 120° C., and then calcined in air for further 3 hours at 500° C. to obtain a support.

<Catalyst Preparation>

An impregnation solution was obtained by dissolving tetraammineplatinum dinitrate [Pt(NH$_3$)$_4$](NO$_3$)$_2$ in ion-exchanged water equivalent to an amount of the water absorption of the support measured in advance. This solution was impregnated into the above-described support by an incipient wetness method and supporting was carried out so that the amount of platinum was 0.8% by mass based on the mass of the support. Next, the obtained impregnated product (catalyst precursor) was dried for 3 hours at 120° C., and then calcined under an air flow for 1 hour at 500° C. to obtain a hydrocracking catalyst A-1.

(Preparation of Hydrocracking Catalyst A-2)
<Support Preparation>

An aluminum-containing beta zeolite was synthesized as follows.

In a 200 ml polytetrafluoroethylene beaker, 25.1 g of tetraethylammonium hydroxide (35% aqueous solution), which is a mold agent, and 1.52 g of aluminum nitrate nonahydrate were mixed while stirring. Then, 20.7 g of tetraethoxysilane was charged, and stirring was continued for 1.5 hours.

This mixed solution was transferred to an evaporator, and under vacuum, the ethanol and water generated by heating to 40° C. were removed. Water and 2.59 g of aqueous hydrogen fluoride (46% aqueous solution) were added into the residue so that the resultant product had the gel ratio shown below to prepare a gel solution. The gel composition at this stage is, based on weight ratio, Si:Al:N:F:H$_2$O=1:0.04:0.6:0.6:7.5.

The obtained gel solution was equally placed in two 45 ml autoclaves, and hydrothermal synthesis was carried out at 150° C. During the hydrothermal synthesis, stirring was carried out for 60 hours at a rate of 20 revolutions/minute, and the resultant product was left to stand for 115 hours. The produced solid and liquid were separated by filtration, and the obtained solid was thoroughly washed with ion-exchanged water. Lastly, a support was obtained by calcining the solid in air for 4 hours at 550° C. The fact that the solid was a beta zeolite was confirmed by X-ray diffraction measurement.

<Catalyst Preparation>

An impregnation solution was obtained by dissolving tetraammineplatinum dinitrate [Pt(NH$_3$)$_4$](NO$_3$)$_2$ in ion-exchanged water equivalent to an amount of the water absorption of the support measured in advance. This solution was impregnated into the above-described support by an incipient wetness method and supporting was carried out so that the amount of platinum was 0.3% by mass based on the mass of the support. Next, the obtained impregnated product (catalyst precursor) was dried for 3 hours at 120° C., and then calcined under an air flow for 1 hour at 500° C. to obtain a hydrocracking catalyst A-2.

(Preparation of Hydrocracking Catalyst A-3)

A kneaded product was prepared by adding water into a mixture of 50% by mass of silica-alumina and 50% by mass of alumina binder, and kneading the resultant mixture into a clay-like state. This kneaded product was extruded, dried, and calcined to prepare a support. A hydrocracking catalyst A-3 was obtained by supporting 5% by weight of nickel and 20% by weight of tungsten on this support by an impregnation method.

(Preparation of Hydroisomerization Catalyst B-1)
<Production of Zeolite ZSM-22>

Zeolite ZSM-22 (hereinafter sometimes referred to as "ZSM-22") formed from crystalline alurninosilicate and having a Si/Al ratio of 45 was produced by hydrothermal synthesis based on the following procedure.

First, the following four types of aqueous solution were prepared.

Solution A: Solution in which 1.94 g of potassium hydroxide was dissolved in 6.75 mL of ion-exchanged water.
Solution B: Solution in which 1.33 g of aluminum sulfate 18-hydrate was dissolved in 5 mL of ion-exchanged water.
Solution C: Solution in which 4.18 g of 1,6-hexanediamine (organic template) was diluted with 32.5 mL of ion-exchanged water.
Solution D: Solution in which 18 g of colloidal silica (Ludox AS-40, manufactured by Grace Davison) was diluted with 31 mL of ion-exchanged water.

Next, solution A was added into solution B, and stirring was carried out until the aluminum component was completely dissolved. Solution C was added into the mixed solution, and then while vigorously stirring at room temperature, the mixture of solution A, B, and C was injected into solution D. In addition, as a "seed crystal" for promoting crystallization, 0.25 g of a separately-synthesized ZSM-22 powder that had not undergone any special treatments after being synthesized was added to the mixture to obtain a gel-like product.

The gel-like product obtained by the above operation was transferred into a stainless steel autoclave reactor with an internal volume of 120 mL, and hydrothermal synthesis reaction was carried out in a 150° C. oven for 60 hours by rotating the autoclave reactor on a tumbling apparatus at a rotational speed of about 60 rpm. After the reaction was finished, the reactor was cooled, and then opened. The product was dried overnight in a 60° C. dryer to obtain ZSM-22 having a Si/Al ratio of 45.

<Zeolite ZSM-22 Extruded Body>

The above-obtained ZSM-22 and alumina as a binder were mixed in a mass ratio of 7:3, a small amount of ion-exchanged water was added, and the resultant mixture was kneaded. The obtained viscous fluid was loaded in an extrusion molder, and then extruded into a cylindrical extruded body having a diameter of about 1.6 mm and a length of about 10 mm. The extruded body was heated in an air atmosphere for 3 hours at 400° C. to obtain a extruded body ZSM-22.

<Ion Exchange of Extruded Body ZSM-22>

An ion-exchange treatment was carried out on the thus-obtained extruded body ZSM-22 with an aqueous solution containing ammonium ions by the following operation.

The thus-obtained ZSM-22 was placed in a flask. 100 mL of 0.5 N aqueous ammonium chloride per 1 g of zeolite ZSM-22 was added, and the resultant mixture was heated under reflux for 6 hours. The mixture was cooled to room temperature, the supernatant was then removed, and the crystalline aluminosilicate was washed with ion-exchanged water. The same amount as above of 0.5 N aqueous ammonium chloride was again added, and the resultant mixture was heated under reflux for 12 hours.

Subsequently, the solid content was collected by filtration, washed with ion-exchanged water, and dried overnight in a 60° C. dryer to obtain ion-exchanged $NH_4$-type ZSM-22. This ZSM-22 was an ion-exchanged zeolite in a state that included an organic template.

<Platinum Supporting and Calcining>

An impregnation solution was obtained by dissolving tetraammineplatinum dinitrate $[Pt(NH_3)_4](NO_3)_2$ in ion-exchanged water equivalent to an amount of the water absorption of the support precursor measured in advance. This solution was impregnated into the above-described support precursor by an incipient wetness method and supporting was carried out so that the amount of platinum was 0.3% by mass based on the mass of the zeolite ZSM-22. Next, the obtained impregnated product (catalyst precursor) was dried overnight in a 60° C. dryer, and then calcined under an air flow for 3 hours at 400° C. to obtain a hydroisomerization catalyst B-1.

(Preparation of Hydroisomerization Catalyst B-2)

<Ion Exchange of ZSM-22 Containing an Organic Template>

An ion-exchange treatment was carried out on the ZSM-22 obtained above in B-1 with an aqueous solution containing ammonium ions by the following operation.

The thus-obtained ZSM-22 was placed in a flask. 100 mL of 0.5 N aqueous ammonium chloride per 1 g of zeolite ZSM-22 was added, and the resultant mixture was heated under reflux for 6 hours. The mixture was cooled to room temperature, the supernatant was then removed, and the crystalline aluminosilicate was washed with ion-exchanged water. The same amount as above of 0.5 N aqueous ammonium chloride was again added, and the resultant mixture was heated under reflux for 12 hours.

Subsequently, the solid content was collected by filtration, washed with ion-exchanged water, and dried overnight in a 60° C. dryer to obtain ion-exchanged $NH_4$-type ZSM-22. This ZSM-22 was an ion-exchanged zeolite in a state that included an organic template.

<Binder Blending, Extruding, and Calcining>

The above-obtained $NH_4$-type ZSM-22 and alumina as a binder were mixed in a mass ratio of 7:3, a small amount of ion-exchanged water was added, and the resultant mixture was kneaded. The obtained viscous fluid was loaded in an extrusion molder, and then extruded into a cylindrical extruded body having a diameter of about 1.6 mm and a length of about 10 mm. The extruded body was heated in a nitrogen atmosphere for 3 hours at 300° C. to obtain a support precursor.

<Platinum Supporting and Calcining>

An impregnation solution was obtained by dissolving tetraammineplatinum dinitrate $[Pt(NH_3)_4](NO_3)_2$ in ion-exchanged water equivalent to an amount of the water absorption of the support precursor measured in advance. This solution was impregnated into the above-described support precursor by an incipient wetness method and supporting was carried out so that the amount of platinum was 0.3% by mass based on the mass of the zeolite ZSM-22. Next, the obtained impregnated product (catalyst precursor) was dried overnight in a 60° C. dryer, and then calcined under an air flow for 3 hours at 400° C. to obtain a hydroisomerization catalyst B-2 containing 0.56% by mass of carbon. The carbon content was measured by "combustion in oxygen gas flow—infrared absorption method". EMIA-920V manufactured by HORIBA, Ltd. was used for the measurement.

In addition, the micropore volume per unit mass of the obtained hydroisomerization catalyst was calculated by the following method. First, to remove moisture adsorbed to the hydroisomerization catalyst, a pre-treatment was carried out for evacuating for 5 hours at 150° C. A nitrogen adsorption measurement was carried out on the pre-treated hydroisomerization catalyst at the temperature of liquid nitrogen (−196° C.) using a BELSORP-max, manufactured by BEL Japan, Inc. Then, the micropore volume (cc/g) per unit mass of the hydroisomerization catalyst was calculated by analyzing the adsorption isotherm of the measured nitrogen by a t-plot method.

Further, the micropore volume $V_z$ per unit mass of the zeolite contained in the catalyst was calculated based on the following expression. When the nitrogen adsorption measurement for the alumina used as a binder was carried out in the same manner as described above, it was confirmed that the alumina did not have any micropores.

$$V_z = V_c / M_z \times 100$$

In the expression, $V_c$ represents the micropore volume per unit mass of the hydroisomerization catalyst, and $M_z$ represents the content (% by mass) of zeolite contained in the catalyst.

The micropore volume per unit mass of the hydroisomerization catalyst B-2 was 0.055 cc/g, and the micropore volume per unit mass of the zeolite contained in the catalyst was 0.079 cc/g.

Example 1

Examples will now be described with reference to the lubricant base oil production apparatus 100 illustrated in FIG. 1. In Example 1, using FT wax (boiling point range of 330 to 620° C.) as a feedstock supplied to the first distillation tower 10, this FT wax was fractionated into a base oil fraction having a boiling point range of 330 to 520° C. and a heavy fraction having a boiling point range of more than 520° C. The heavy fraction fractionated was hydrocracked at a reaction temperature of 325° C., a hydrogen pressure of 5 MPa, a hydrogen/oil ratio of 680 $Nm^3/m^3$, and a liquid hourly space velocity of 2.0 For the hydrocracking catalyst, the hydrocracking catalyst A-1 was used. The obtained hydrocracked oil was mixed with the FT wax and supplied to the first distillation tower 10. Further, the base oil fraction fractionated by the first distillation tower 10 was subjected to isomerization and dewaxing at an isomerization reaction temperature of 325° C., a hydrogen pressure of 15 MPa, a hydrogen/oil ratio of 500 $Nm^3/m^3$, and a liquid hourly space velocity of 1.5 $h^{-1}$. For the hydroisomerization catalyst, the hydroisomerization catalyst B-1 was used.

After this process had been performed for 200 hours, the yield of the main target fraction (fraction having a boiling point range of 330 to 520° C.) in the obtained dewaxed oil was 65% by volume based on the supplied FT wax.

Example 2

The same process as Example 1 was carried out, except that the hydroisomerization catalyst B-1 was changed to the hydroisomerization catalyst B-2. The yield of the main target fraction (fraction having a boiling point range of 330 to 520° C.) in the obtained dewaxed oil was 70% by volume based on the supplied FT wax.

Example 3

The same process as Example 1 was carried out, except that the hydrocracking catalyst A-1 was changed to the hydrocracking catalyst A-2, and the hydrocracking conditions were changed to a reaction temperature of 325° C., a hydrogen pressure of 15 MPa, a hydrogen/oil ratio of 500 Nm$^3$/m$^3$, and a liquid hourly space velocity of 1.5 h$^{-1}$. The yield of the main target fraction (fraction having a boiling point range of 330 to 520° C.) in the obtained dewaxed oil was 55% by volume based on the supplied FT wax.

Example 4

The same process as Example 1 was carried out, except that the feedstock supplied to the first distillation tower 10 was changed to slack wax, which is a petroleum-derived hydrocarbon oil, and the hydrocracking catalyst A-1 was changed to the hydrocracking catalyst A-3. The yield of the main target fraction (fraction having a boiling point range of 330 to 520° C.) in the obtained dewaxed oil was 63% by volume based on the supplied slack wax.

Example 5

The same process as Example 1 was carried out, except that the feedstock supplied to the first distillation tower 10 was changed to slack wax, which is a petroleum-derived hydrocarbon oil, the hydrocracking catalyst A-1 was changed to the hydrocracking catalyst A-3, and the hydroisomerization catalyst B-1 was changed to the hydroisomerization catalyst B-2. The yield of the main target fraction (fraction having a boiling point range of 330 to 520° C.) in the obtained dewaxed oil was 68% by volume based on the supplied slack wax.

Comparative Example 1

All of an FT wax having a boiling point range of 330° C. or more was subjected to isomerization and dewaxing at an isomerization reaction temperature of 325° C., a hydrogen pressure of 15 MPa, a hydrogen/oil ratio of 500 Nm$^3$/m$^3$, and a liquid hourly space velocity of 1.5 h$^{-1}$. For the hydroisomerization catalyst, the hydroisomerization catalyst B-1 was used. The yield of the main target fraction (fraction having a boiling point range of 330 to 520° C.) in the obtained dewaxed oil was 50% by volume based on the supplied FT wax.

REFERENCE SIGNS LIST

100 . . . Lubricant Base Oil Production Apparatus, 10 . . . First Distillation Tower, 20 . . . Second Distillation Tower, 30 . . . First Reactor, 40 . . . Second Reactor, 50 . . . Third Reactor, 60 . . . Third Distillation Tower, 70 . . . Fourth Distillation Tower.

The invention claimed is:

1. A method for producing a lubricant base oil, the method comprising:
    fractionating, from a hydrocarbon oil containing a base oil fraction and a heavy fraction that is heavier than the base oil fraction, the base oil fraction and the heavy fraction to form a fractionated base oil and a fractionated heavy fraction;
    obtaining a dewaxed oil by isomerization and dewaxing of the fractionated base oil fraction in the presence of a hydroisomerization catalyst,
    hydrocracking the fractionated heavy fraction to form a hydrocracked fraction, and returning the hydrocracked heavy fraction to the fractionating step;
    wherein in the isomerization and dewaxing of the fractionated base oil fraction, the hydroisomerization catalyst is a hydroisomerization catalyst containing a support that includes a zeolite having a one-dimensional porous structure including a 10-membered ring and a binder, and platinum and/or palladium supported on the support, in which a carbon content of the catalyst is 0.4 to 3.5% by mass and a micropore volume is 0.02 to 0.12 cc/g; and
    the zeolite is derived from an ion-exchanged zeolite obtained by ion-exchanging an organic template-containing zeolite that contains an organic template and has a one-dimensional porous structure including a 10-membered ring in a solution containing ammonium ions and/or protons, in which a micropore volume per unit mass is 0.01 to 0.12 cc/g.

2. The method according to claim 1, wherein the base oil fraction is a fraction having a boiling point range of 330 to 520° C.

3. The method according to claim 1, wherein the hydrocarbon oil contains a Fischer-Tropsch synthesis reaction oil, and
    the hydrocracking is carried out in the presence of hydrogen by bringing the heavy fraction into contact with a hydrocracking catalyst containing an inorganic support that is a solid acid and one or more metals selected from group 6, group 8, group 9 and group 10 of the periodic table that is supported on the inorganic support and that has a hydrogenation activity.

4. The method according to claim 1, wherein the hydrocarbon oil contains a petroleum-derived hydrocarbon oil, and
    the hydrocracking is carried out in the presence of hydrogen by bringing the heavy fraction into contact with a hydrocracking catalyst containing a porous inorganic oxide that includes two or more elements selected from aluminum, silicon, zirconium, boron, titanium, and magnesium, and one or more metals selected from the elements of group 6, group 8, group 9 and group 10 of the periodic table that are supported on the porous inorganic oxide.

5. The method according to claim 1, wherein a conversion rate of the hydrocracking is 20 to 50% by volume.

* * * * *